G. H. CORLISS.
CUT-OFF AND WORKING VALVE FOR STEAM ENGINES.
No. 762. Reissued July 12, 1859.
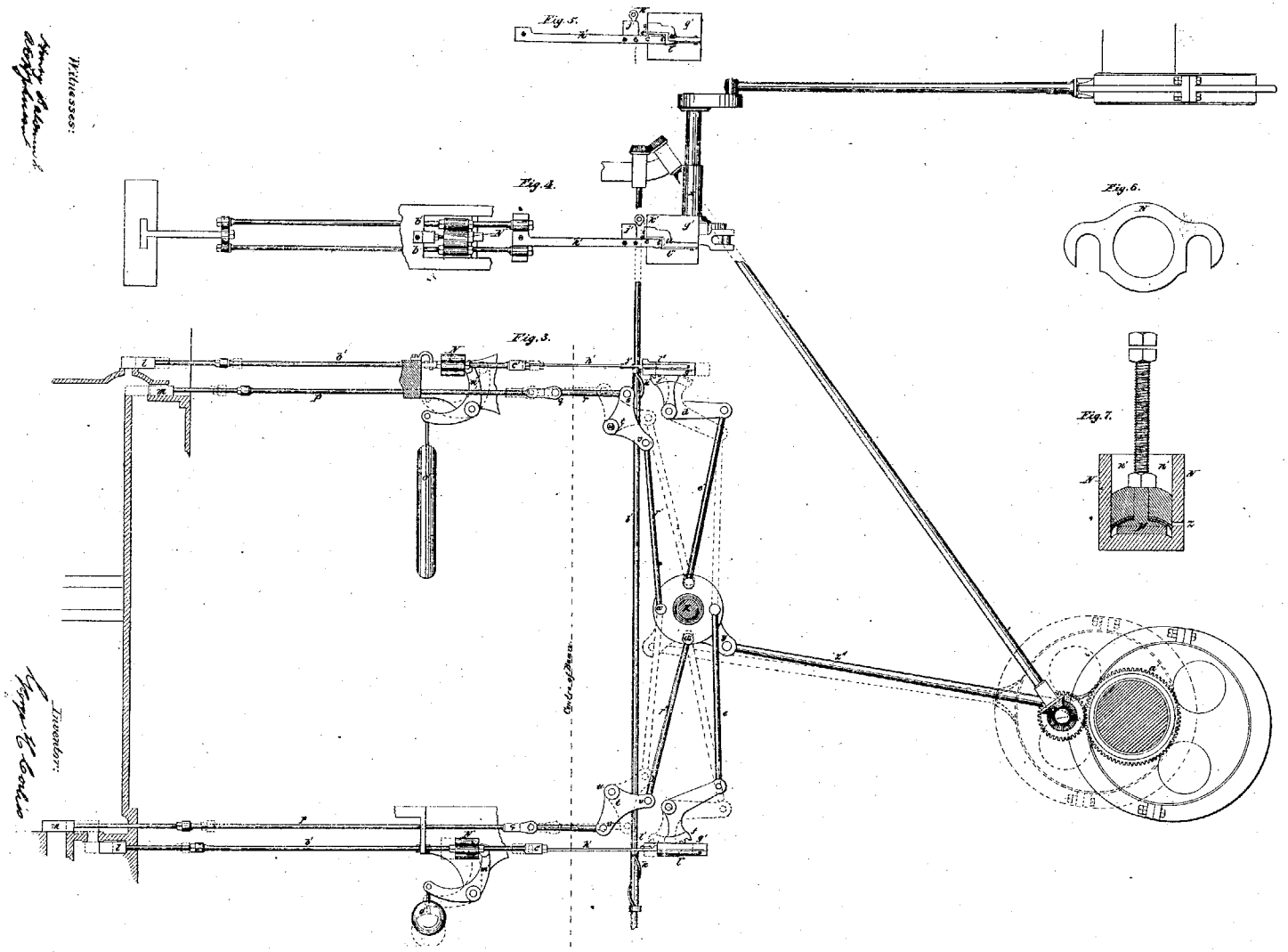

UNITED STATES PATENT OFFICE.

GEORGE H. CORLISS, OF PROVIDENCE, RHODE ISLAND.

IMPROVEMENT IN CUT-OFF AND WORKING VALVES OF STEAM-ENGINES.

Specification forming part of Letters Patent No. 6,162, dated March 10, 1849; Reissue No. 200, dated May 13, 1851; Reissue No. 762, dated July 12, 1859.

*To all whom it may concern:*

Be it known that I, GEORGE H. CORLISS, of the city and county of Providence, and State of Rhode Island, have invented a new and useful Improvement in Liberating Valve-Gear of Steam-Engines; and I do hereby declare that the following is a full, clear, and exact description of the same, reference being had to the accompanying drawings, in which—

Figure 3 represents in elevation the valve mechanism of a beam-engine, to which my invention has been applied. Fig. 4 is a top view of certain portions of the same, and Fig. 5 a view of certain parts of the valve-gear detached from the remainder.

The invention which is the subject of this patent is applicable to engines in which the valves are operated by a liberating valve-gear—that is to say, a valve-gear which embodies two forces for operating the steam-valves of steam-engines—the one for their opening movement, which may be derived from the engine itself, the other for the closing movement, which may be derived from weights or springs; and while the arrangement may be such that the reciprocal operations of these two forces may give the proper movements for closing the valves at certain fixed periods of the stroke of the piston there must be embodied a provision for effecting the closing of the valves at variable periods of the stroke by such a release of that portion of the valve-gear actuated by one force from that actuated by the other force as will anticipate the time at which the valves would be closed, if their closing were effected by the return movements of the opening mechanism.

My present invention consists in combining with the other portions of a liberating valve-gear a helical cam in such manner that the cam shall by a continuous rotary movement act with equal efficiency at every portion of the stroke of the piston in liberating the valves from the control of their opening mechanism. This device is represented in the accompanying drawings as applied to the valve apparatus of an engine embodying other inventions for which Letters Patent have been granted to me bearing even date herewith. As, however, it may be applied to valve apparatus which does not embody these inventions, and as these may be used independently of it I shall in the present specification describe only so much of the mechanism of the steam-engine as I deem necessary to communicate a clear understanding of the invention above set forth.

In the mechanism represented in the accompanying drawings the part of the valve-gear connected permanently with each steam-valve *l* consists of a double valve-rod, *b'*, upon which a weight, *o'*, is arranged to act through the intervention of a bent lever or bell-crank, *m'*, to cause the valve to close its port whenever the part of the valve-gear connected with each valve is separated from the remainder of the valve-gear. The other part of the valve-gear consists in this instance of the sliding blocks *g' g'*, the bell-cranks *f' f'*, having teeth that engage with corresponding teeth in the blocks, the wrist-plate *x* and its appurtenances, and the eccentric *a'* with its appurtenances, which in its revolution causes the sliding blocks to traverse to and fro.

The part of the valve-gear connected permanently with each valve is fitted with a variable link or medium of connection, *h'*, which is hinged to the valve-rod *b'*, and has an acting face, *c*, which can be placed in contact with a corresponding face, *e*, formed upon the adjacent sliding block. When these two faces are in contact, the part of the valve-gear connected permanently with the valve is moved along with the remainder, so that the valve is drawn open by the power of the engine, and as the weight *o'* is constantly tending to move the valve back over its port the two faces remain in contact until a separation is made by a lateral movement of the one to the other. The lateral movement or change of position of the variable link is effected when steam is to be cut off by means of the helical cam *k'*, which is turned by the power of the engine through the intervention of a series of shafts and cog-wheels, the last of which is secured to the crank-shaft; and, as in this engine the shank of the link is not within the range of motion of the cam, a projection, *j'*, is secured to the link, upon which the cam bears when the separation of one part of the valve-gear from the other, and the consequent liberation of the steam-valve from the control of the power of the engine, takes place. As the engine in the present example is double-acting, there are two steam-valves, one for each end of the cylinder, and a separate helical cam is provided for the variable link of each steam-valve. These helical cams are both secured to the same revolving shaft $l'$, and the latter is arranged to move endwise in its boxes. The protuberant portions of the helical cam extend around the shaft $l'$ in such direction (having reference to the movement of the shaft) that the higher the shaft and its cams are raised the sooner will the cams act upon the projections and change the positions of the variable links $h'$, and the more the cams are lowered the later will the cams act upon and change the positions of the variable links. If the shaft be lowered sufficiently, the cams will be below the range of the projections of the variable links, in which case the cams become inoperative and the valves are not liberated from the control of the engine. The cam-shaft may be moved endwise, so as to change the times at which the helical cams act upon the variable links either by hand or by means of the regulator of the engine. In the present instance the cam shaft is designed to be moved by the latter means, in which case the engine will embrace my improved method of regulating the movement of engines. This, however, constitutes no part of my present invention, but is the subject of another patent which has been granted to me bearing even date herewith.

In order that each steam-valve may uncover its port at the proper moment to admit steam to the cylinder the adjacent member of the part of the valve-gear appertaining to the eccentric, which in this instance is the sliding block $g'$, is moved back by the turning of the eccentric by the power of the engine into such a position that the link $h'$ can be moved laterally to place its acting-face within the range of motion of the face upon the sliding block, when the latter is again moved to draw the valve open.

In a liberating valve-gear for steam-engines, I claim—

The combination of a helical cam with the opening and closing mechanism of the steam-valve, substantially as described.

In testimony whereof I have hereunto subscribed my name.

GEORGE H. CORLISS.

Witnesses:
HENRY BALDWIN, Jr.,
JOHN S. HOLLINGSHEAD.